Jan. 2, 1951   R. M. STRICKLAND ET AL   2,536,864
METHOD OF PRODUCING THREAD-CUTTING CHASERS
Filed Nov. 23, 1946   2 Sheets-Sheet 1
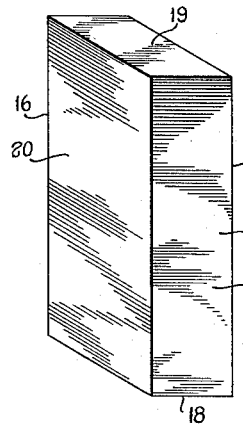
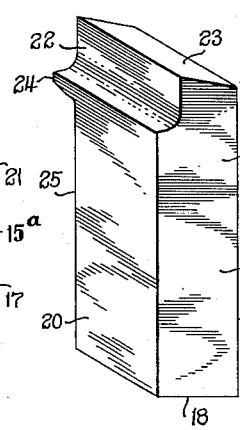
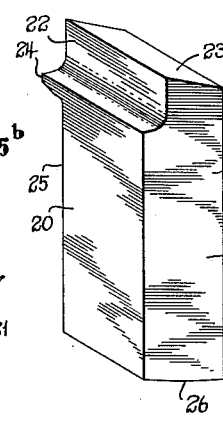
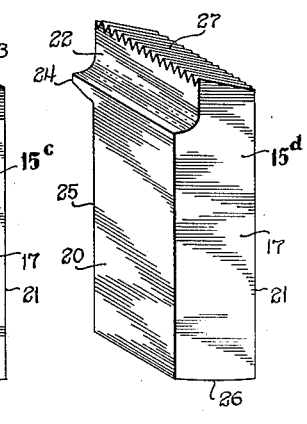
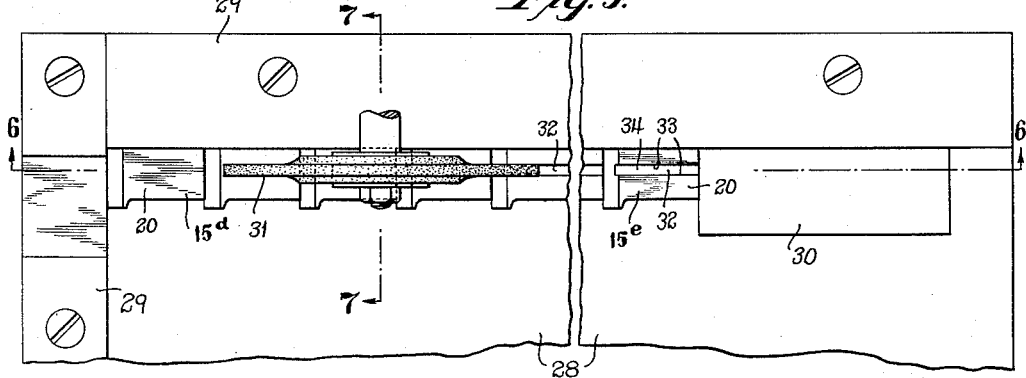
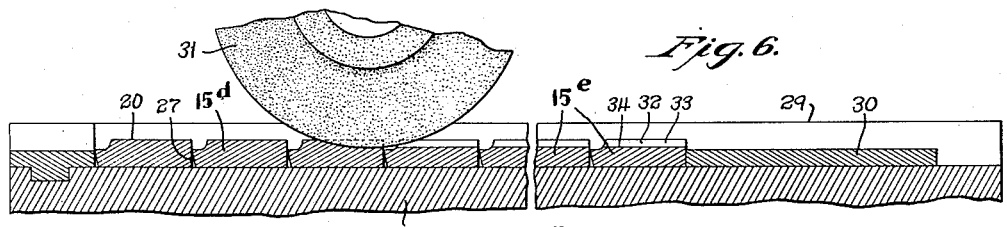
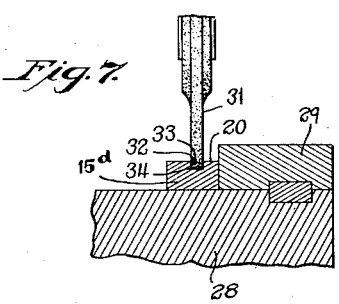
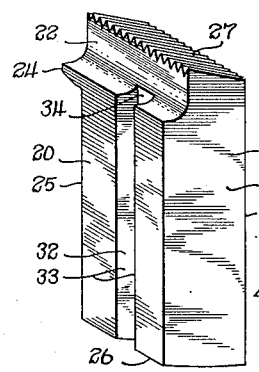
Inventor
Royce M. Strickland
Johan V. Arvidson
By Seymour, Carter Nichols
Attorneys

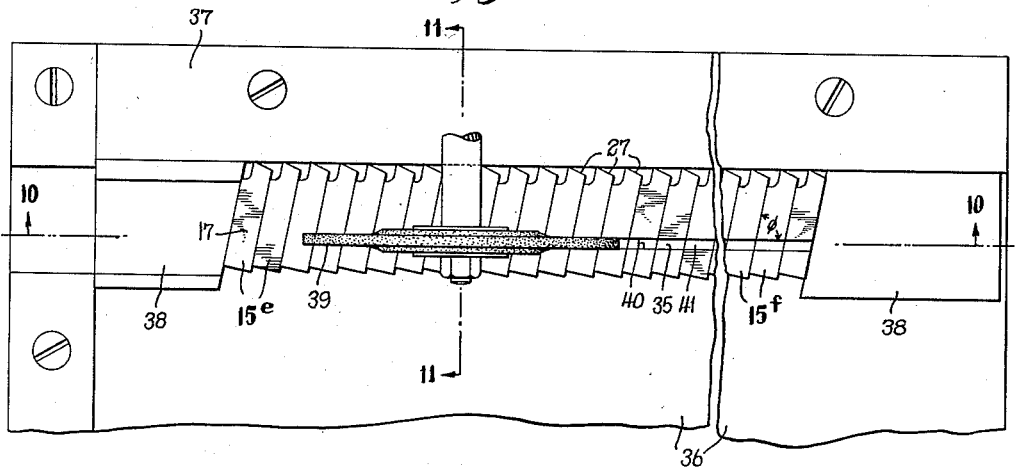
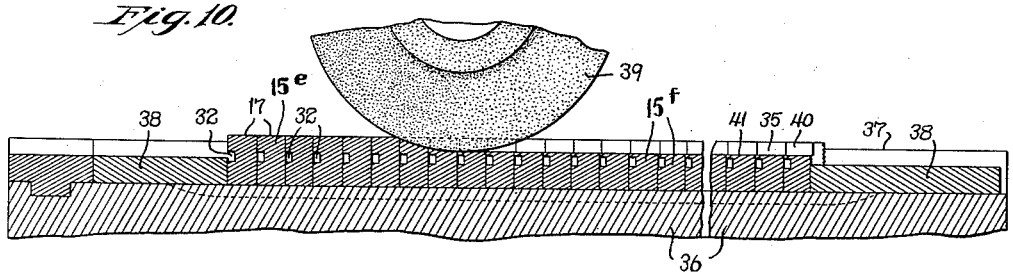
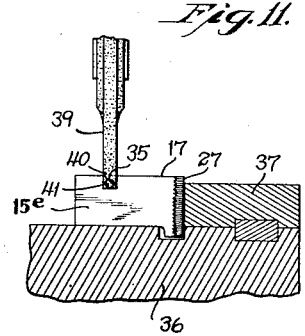
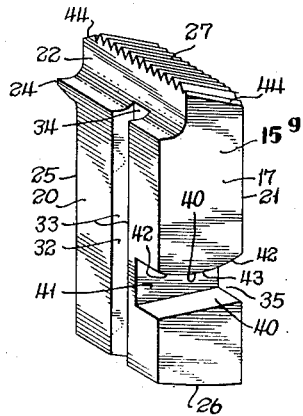
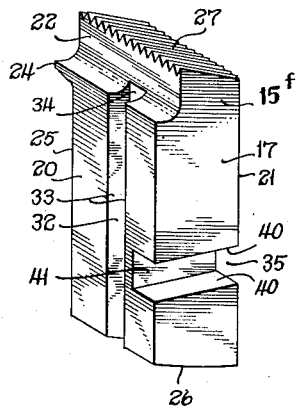

Patented Jan. 2, 1951

2,536,864

UNITED STATES PATENT OFFICE

2,536,864

METHOD OF PRODUCING THREAD-CUTTING CHASERS

Royce M. Strickland, New Haven, and Johan V. Arvidson, West Haven, Conn., assignors, by mesne assignments, to Greenfield Tap and Die Corporation, Greenfield, Mass., a corporation of Massachusetts Application November 23, 1946, Serial No. 711,888

6 Claims. (Cl. 51—288)

The present invention relates in general to thread-cutting tools and more especially to chasers which are adapted to be mounted in sets of two or more in self-operating die-heads for cutting threads on work-pieces.

An object of the present invention is to provide an improved method for producing thread-cutting chasers.

A further object of the invention is to provide an improved method for producing thread-cutting chasers which is economical and which produces superior chasers in comparatively few operations.

A still further object of the present invention is to provide a novel method of the character referred to, whereby the thread-cutting teeth of partially-completed chasers are used as reference-surfaces for forming the operating-grooves of the chasers.

A still further object of the invention is to provide a novel method of the character referred to, whereby a relatively large number of chaser-blanks may be subjected simultaneously to finishing operations of the greatest accuracy.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a perspective view of a hardened and tempered chaser-blank which has been rough-ground to a predetermined thickness and height and has had its ends squared;

Fig. 2 is a perspective view of the hardened chaser-blank shown in Fig. 1 after the blank has been ground to finished thickness and provided with a partially-ground rake and cutting-face. This is the stage at which the blanks are carried in stock;

Fig. 3 is a perspective view of a chaser-blank which has been taken from stock, the first operation performed thereon consisting of grinding the chaser-blank to its finished over-all length with a radius at its rear end;

Fig. 4 represents the chaser-blank of Fig. 3 having thread-cutting teeth ground in its cutting-edge;

Fig. 5 is a schematic plan view of the improved method of gang-grinding the longitudinal keyways in the chaser-blanks of F'g. 4;

Fig. 6 is a sectional elevation of the gang-grinding assembly taken on line 6—6 of Fig. 5;

Fig. 7 is a sectional elevation on line 7—7 of Fig. 5;

Fig. 8 is a perspective view of a chaser-blank following the grinding of its longitudinal keyway;

Fig. 9 is a schematic plan view of the improved method of gang-grinding the transverse control-grooves of the chaser-blanks;

Fig. 10 is a sectional elevation of the gang-grinding assembly on the line 10—10 of Fig. 9;

Fig. 11 is a sectional elevation on line 11—11 of Fig. 9;

Fig. 12 is a perspective view of a chaser-blank following the grinding of its transverse control-groove; and Fig. 13 is a perspective view of the chaser-blank showing the clearance formed at opposite ends of one wall of the transverse control-groove and the bevels formed on the first and last thread-cutting teeth.

Before proceeding with a detailed description of one mode of carrying out the present invention, it may here be pointed out that in order to form accurate threads on a work-piece, the control-groove, which is formed in the bottom edge of each individual chaser, must be located with the utmost accuracy in relation to the respective thread-cutting teeth, while the control-grooves of a given set of chasers must be very accurately located with respect to each other. One of the numerous sources of manufacturing difficulties in connection with the production of thread-cutting chasers, by present-day methods, is that of providing a control-groove which will be so accurately located as to inevitably cause the production of accurate threads on a work-piece. Moreover, present-day methods have been characterized by prescribed steps which make it infeasible to stock large quantities of partially-completed blanks, pending further selective operations thereon, each chaser-blank requiring, in general, individual handling.

Referring to the drawings which show in succession the principal steps followed in carrying out the improved method of this invention, the chaser-blanks are formed from stock material which, as shown at 15a in Fig. 1, comprises a substantially-rectangular block of steel cut from a length of soft steel stock and subsequently hardened and tempered, or cut from a length of hardened and tempered steel stock. The latter is the preferred way of supplying the chaser-blank stock material, although the hardening of soft steel stock may be equally successful. The blank 15a has been subjected to several preliminary flat-grinding operations which include rough-grinding the blank to a predetermined thickness and height, squaring the ends of the blank and removing burrs from the corners and edges thereof, all of which operations are performed by standard techniques known in the art. The blank 15a comprises top and bottom surfaces 16 and 17 respectively, a rear end 18 opposite which is the cutting-edge 19 which is adapted, as hereinafter described, to embody the thread-cutting teeth of the chaser-blank. The side 20 of the blank is referred to as the "keyway side," while the opposite side 21 of the blank is hereinafter referred to as the "reference side" or "reference surface" of the blank.

Following these preliminary grinding operations, the blank 15a is then ground to finished thickness, as shown at 15b in Fig. 2, by conventional flat-grinding operations. It is preferable, though not necessary, to the success of the invention, to first flat-grind the reference-surface 21 of the blank and thereafter to complete the grinding operations on the other surfaces 16, 17 and 20 of the blank by using the surface 21 for reference purposes. Additional steps taken in forming the blank 15b include rough-grinding the cutting-face 22 of the blank and the rake 23 on the cutting-edge 19 thereof. Moreover, chasers of the type disclosed and described herein by way of illustration are known to the trade as projection-chasers, the chaser shown in the drawings being a 9/16" D type projection-chaser, and are characterized by shoulders or projections 24 adjacent the cutting-edges of the blanks. These projections 24 are preferably formed by grinding off the tops 16 of the blanks to form flats 25 therealong.

In accordance with the improved method of this invention, the over-all length of each chaser-blank which has been processed to stage 15b of its manufacture is greater than the maximum lengths of all standard types of chasers and in this form the chasers 15b are adapted to be stocked. When the chaser manufacturer is ordered to make up a set of chasers according to certain specifications as, for example, a 9/16" D type projection-chaser, the required number of chaser-blanks 15b are taken from stock and processed, as hereinafter described, to produce a finished set. For the purpose of clarity, the description which follows will deal with the sequence of operations performed on one blank of a set but it will be understood that in practice a plurality of blanks required to form a set of chasers are processed simultaneously.

Assuming a blank 15b has been taken from stock, the first operation performed on the blank is that of reducing the over-all length of the blank to a standard length for a specific type of chaser. By way of illustrating the over-all length of each blank 15b as stocked, the amount of metal which must be removed from the rear end 18 thereof to form the blank 15c of standard length for a 9/16" D type projection-chaser may be of the order of 1/16". Ths grinding operation may be a flat-grinding operation, but is generally a radius-grind, so as to provide a cylindrical surface of revolution 26 on the rear end of the blank whereby the rear end thereof will present an arcuate surface substantially concentric with the periphery of the chaser-holder or die-head. The preferred length of the radius of the surface 26 is substantially 2" but it will be appreciated that the 2" radius is typical for the type of projection-chasers identified above and that this dimension will vary, depending upon the specifications of the chaser being manufactured and the size of the die-head.

The next operation on the blank 15c is that of grinding the thread-cutting teeth 27 in the raked cutting-edge 23 thereof to form the blank 15d. This operation is performed by engaging the flat-ground reference-surface 21 of the blank on the magnetic chuck or equivalent supporting-surface of a grinding machine and moving the raked cutting-edge 23 of the blank into engagement with the periphery of a rotating multiple-groove grinding-wheel of the type in general use for thread-grinding purposes. It will be appreciated that after grinding the thread-cutting teeth 27 in the raked cutting-edge 23 of the blank 15d (see Fig. 4), the blank is adapted for use only in cutting a thread of a specific diameter and pitch. Consequently, it is proposed to utilize the teeth 27 of the blank 15d as the reference-surface for subsequent finishing operations, the first of which may be that of grinding the longitudinal keyway in the side 20 of the blank.

Referring to Figs. 5, 6 and 7, the proposed method of grinding the longitudinal keyway is by a gang-grinding technique wherein a plurality of blanks 15d are assembled in end-to-end relationship on the reciprocable platen or magnetic chuck 28 of a grinding-machine, the blanks being supported securely thereon by suitable guides 29 and spacer-blocks 30, in a manner well known to the art. The assembled blanks are then adapted to be moved longitudinally in a substantially-horizontal plane beneath the lower edge of a grinding-wheel 31 which is mounted on a horizontal shaft and adapted to rotate in a vertical plane parallel to the longitudinal path of movement of the blanks.

As indicated in Fig. 6, the grinding-wheel 31 is adapted to grind continuously a longitudinal keyway 32 of rectangular cross section in successive blanks throughout the lengths of their sides 20 and in one single pass of the blanks relative to the rotating grinding-wheel. As shown in Fig. 7, the cross section of the periphery of the grinding-wheel 31 is substantially rectangular, having been dressed to the exact dimensions required for the keyway 32, and hence is adapted to grind simultaneously from solid all three surfaces of the longitudinal keyway to finished dimensions, both the side walls 33 and the bottom wall 34 of the keyway being ground to a mirror-like finish. The chaser-blank is now in the form shown at stage 15e in Fig. 8.

The next succeeding step in the manufacture of the chaser-blank is that of grinding the transverse control-groove 35, sometimes referred to as the "cam-lug slot," in the bottom 17 of the blank. Referring to Figs. 9, 10 and 11, it is proposed to grind the transverse control-grooves 35 of a plurality of blanks 15e by gang-grinding and to this end, the blanks 15e are adapted to be assembled on the reciprocable platen or magnetic chuck 36 of a grinding machine and secured thereon by a guide 37 and spacer-blocks 38. In assembling the blanks 15e on the platen 36, the longitudinal axis of each blank is adapted to make an acute angle $\phi$ with respect to the plane of rotation of the grinding-wheel 39, the angle $\phi$ being equal to the angle of obliquity which the longitudinal axis of the transverse control-groove 35 of each blank is adapted to make relative to the longitudinal axis thereof. Moreover, as assembled on the platen 36 of the grinding machine, the teeth 27 of the blanks are adapted to engage the guide 37 so that the points of the teeth constitute reference-surfaces for locating the transverse control-groove 35 of each blank at precisely the right distance from its thread-cutting teeth. The control-grooves 35 are adapted to be ground in the bottoms 16 of the blanks by a single pass of the assembled blanks beneath the edge of the rotating grinding-wheel 39, the periphery of which is dressed to the exact shape and dimensions required for the control-grooves 35, as shown in Fig. 11, whereby the two spaced parallel walls 40 and the bottom wall 41 of each groove are ground simultaneously from solid to finished dimensions and with a mirror-like finish. The grinding of the transverse control-groove 35 may be regarded as completing the major grinding operations performed on the blank 15e, the latter now being in the form shown at stage 15f in Fig. 12.

The next succeeding grinding operation performed on the blanks 15f is that of rounding-off the opposite ends respectively of one wall of the transverse control-groove 35 to provide clearance, the latter wall being hereinafter termed the "advancing wall" of the control-groove, its opposite wall being referred to as the "retracting wall." The rounded surfaces 42 at opposite ends of the advancing wall 40 of the control-grooves 35 are formed by a radius-grinding operation, and it will be noted that the inner ends of the respective rounded surfaces 42 do not join but blend into the opposite ends respectively of a flat 43 hereinafter termed a "telltale" or witness mark. The latter constitutes a portion of the advancing wall of the control-groove which has been untouched or unchanged by the radius-grinding operations, so that the accuracy of the control-groove is not impaired, and in the embodiment shown is substantially 1/16" wide. In forming the rounded surfaces 42 at opposite ends respectively of the advancing wall of the control-groove, the teeth 27 of the blank are again used as reference-surfaces in setting up the blank in proper relation to the radius-grinding wheel. Following the grinding of the rounded clearance-surfaces 42 of the control-groove 35, the lead and lag thread-cutting teeth are beveled as at 44 in Fig. 13, after which several other finishing operations are performed to produce the blank 15g, among which are the steps of finish-grinding the rake of the teeth 27 and chamfering all corners and edges of the chaser. All of these latter operations are conventional and are not numbered among the novel steps of the present invention.

From the foregoing disclosure, it will appear that in accordance with the novel method of this invention, finished chasers may be quickly and accurately formed from hardened and tempered steel blanks which have been previously stocked in partially-completed form. Moreover, relatively few operations are required to complete the chasers, the principal operations being those of grinding the teeth thereon and thereafter using the ground teeth as reference-surfaces for grinding the longitudinal keyway and transverse control-groove of the blank, the opposite ends of which are subsequently rounded, as described above.

The improved method of this invention is adapted to form both regular and projection-type chasers with equal facility, and surpasses in economy and rate of production any method which has been used previously for the manufacture of chaser-blanks. This latter aspect of the invention is due primarily to the novel concept of utilizing the thread-cutting teeth of hardened partially-completed blanks taken from stock, as reference-surfaces for subsequent finishing operations; as a consequence of which an inventory consisting of a relatively small number of partially-completed blanks may be kept, any one of which may be subsequently finished to any of the standard chaser dimensions. It should be noted that heretofore it has been impracticable to store partially-completed blanks, inasmuch as all such blanks, by previous methods of manufacture, have, of necessity, been restricted in use to a specific type of chaser and hence, in order to have partially-finished chasers available for finishing operations for all standard types of chasers, a very large, expensive and uneconomical inventory has been required.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

We claim:

1. The method for producing a set of thread-cutting chasers, which method includes a plurality of successive steps performed in the following predetermined sequence: grinding in a single operation flat-ground reference surfaces on a set of previously hardened and tempered chaser-blanks; subsequently grinding in a single operation a plurality of thread-cutting teeth in corresponding surfaces of the said set of hardened and tempered chaser-blanks other than the said flat-ground reference surfaces; thereafter simultaneously grinding in a single operation all three walls of longitudinal keyways in corresponding surfaces of the said set of chaser-blanks other than the said surfaces thereof formed with the thread-cutting teeth; and then using the points of said teeth as reference surfaces to simultaneously grind in a single operation all three walls of transverse control-grooves in corresponding surfaces of the said set of chaser-blanks other than the said surfaces thereof formed with the said thread-cutting teeth and the said longitudinal keyways respectively.

2. The method for producing a set of thread-cutting chasers, which method includes a plurality of successive steps performed in the following predetermined sequence: grinding in a single operation flat-ground reference surfaces on a set of previously hardened and tempered chaser-blanks; subsequently grinding in a single operation a plurality of thread-cutting teeth in corresponding surfaces of the said set of hardened and tempered chaser-blanks other than the said flat-ground reference surfaces; thereafter simultaneously grinding in a single operation all three walls of longitudinal keyways in corresponding surfaces of the said set of chaser-blanks other than the said flat-ground reference surfaces and the said surfaces formed with the thread-cutting teeth; and then using the points of said teeth as reference surfaces to simultaneously grind in a single operation all three walls of transverse control-grooves in corresponding surfaces of the said set of chaser-blanks other than the said surfaces thereof formed with the said thread-cutting teeth and the said longitudinal keyways respectively.

3. The method for producing a set of thread-cutting chasers, which method includes a plurality of successive steps performed in the following predetermined sequence: grinding in a single operation flat-ground reference surfaces on a set of previously hardened and tempered chaser-blanks; subsequently grinding in a single operation a plurality of thread-cutting teeth in corresponding surfaces of the said set of hardened and tempered chaser-blanks other than the said flat-ground reference surfaces; thereafter simultaneously grinding in a single operation all three walls of longitudinal keyways in corresponding surfaces of the said set of chaser-blanks other than the surfaces thereof formed with the said thread-cutting teeth; thereafter using the points of said teeth as reference surfaces to simultaneously grind in a single operation all three walls of transverse control-grooves in corresponding surfaces of the said set of chaser-blanks other than the said surfaces thereof formed with the said thread-cutting teeth and the said longitudinal keyways respectively; and then using the points of said teeth as reference surfaces to grind the opposite ends of one corresponding wall of each of the said control-grooves to provide clearance at the opposite ends thereof and to leave the intermediate portions of the said corresponding walls unchanged.

4. The method for producing a set of thread-cutting chasers, which method includes a plurality of successive steps performed in the following predetermined sequence: grinding in a single operation flat-ground reference surfaces on a set of previously hardened and tempered chaser-blanks; subsequently grinding in a single operation a plurality of thread-cutting teeth in corresponding surfaces of the said set of hardened and tempered chaser-blanks other than the said flat-ground reference surfaces; thereafter simultaneously grinding in a single operation all three walls of longitudinal keyways in corresponding surfaces of the said set of chaser-blanks other than the said flat-ground reference surfaces thereof and the said surfaces formed with the said thread-cutting teeth; thereafter using the points of said teeth as reference surfaces to simultaneously grind in a single operation all three walls of transverse control-grooves in corresponding surfaces of the said set of chaser-blanks other than the said surfaces thereof formed with the said thread-cutting teeth and the said longitudinal keyways respectively; and then using the points of said teeth as reference surfaces to grind the opposite ends of one corresponding wall of each of the said control-grooves to provide clearance at the opposite ends thereof and to leave the intermediate portions of the said corresponding walls unchanged.

5. A method for producing a set of thread-cutting chasers, which method includes a plurality of successive steps performed in the following predetermined sequence: grinding in a single operation flat-ground reference surfaces on a set of previously hardened and tempered chaser-blanks; subsequently grinding in a single operation a plurality of thread-cutting teeth in corresponding surfaces of the said set of hardened and tempered chaser-blanks other than the said flat-ground reference surfaces; and thereafter using the points of said thread-cutting teeth as reference surfaces to simultaneously grind in a single operation all three walls of transverse control-grooves in corresponding surfaces of the said set of chaser-blanks other than the surfaces thereof formed with the said thread-cutting teeth.

6. The method for producing a set of thread-cutting chasers, which method includes a plurality of successive steps performed in the following predetermined sequence: grinding in a single operation flat-ground reference surfaces on a set of previously hardened and tempered chaser-blanks; subsequently grinding in a single operation a plurality of thread-cutting teeth in corresponding surfaces of the said set of hardened and tempered chaser-blanks other than the said flat-ground reference surfaces; thereafter using the points of said thread-cutting teeth as reference surfaces to simultaneously grind in a single operation all three walls of transverse control-grooves in corresponding surfaces of the said set of chaser-blanks other than the surfaces thereof formed with the thread-cutting teeth; and then using the points of said thread-cutting teeth as reference surfaces to grind the opposite ends of one corresponding wall of each of the control-grooves to provide clearance at the opposite ends thereof and to leave the intermediate portions of the said corresponding walls unchanged.

ROYCE M. STRICKLAND.
JOHAN V. ARVIDSON.

REFERENCES CITED

The following references are of record in the file of this patent:

UNITED STATES PATENTS

| Number | Name | Date |
| --- | --- | --- |
| 798,352 | Leonard | Aug. 29, 1905 |
| 1,271,495 | Ward | July 2, 1918 |
| 1,555,853 | Higgins | Oct. 6, 1925 |
| 1,557,005 | Bath | Oct. 13, 1925 |
| 1,603,446 | Breitenstein | Oct. 19, 1926 |
| 1,694,560 | Parish | Dec. 11, 1928 |
| 1,743,116 | Cook | Jan. 14, 1930 |
| 1,793,727 | Walker | Feb. 24, 1931 |
| 1,981,445 | Aker | Nov. 20, 1934 |
| 2,096,422 | Brunner | Oct. 19, 1937 |
| 2,144,987 | Miller | Jan. 24, 1939 |
| 2,394,645 | Turner et al. | Feb. 12, 1946 |